March 8, 1966  P. E. McCULLOUGH  3,238,710
LAWN TRIMMING DEVICE

Filed Aug. 17, 1964  2 Sheets-Sheet 1

INVENTOR.
Philip E. McCullough
BY Harold E. Cole
Attorney

March 8, 1966  P. E. McCULLOUGH  3,238,710
LAWN TRIMMING DEVICE
Filed Aug. 17, 1964  2 Sheets-Sheet 2
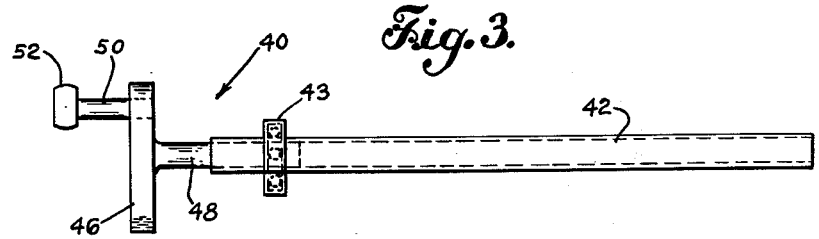
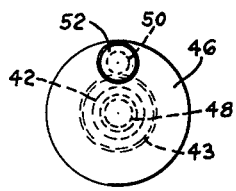
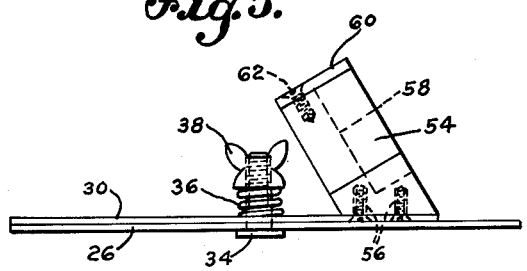
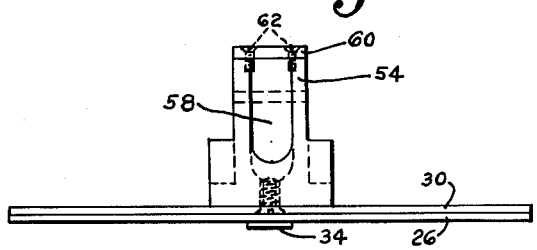
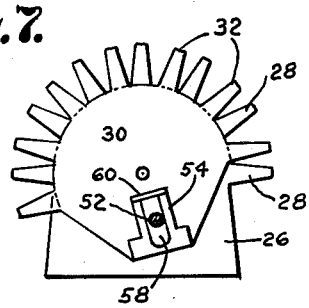
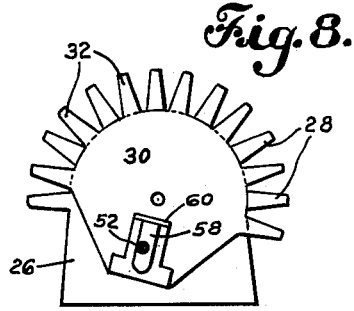
INVENTOR.
Philip E. McCullough
BY Harold E. Cole
Attorney

United States Patent Office 3,238,710
Patented Mar. 8, 1966

3,238,710
LAWN TRIMMING DEVICE
Philip E. McCullough, 116 Howard St., Saugus, Mass.
Filed Aug. 17, 1964, Ser. No. 390,049
2 Claims. (Cl. 56—246)

This invention relates to a device to trim lawns and the like.

One object of my invention is to provide a device that will trim grass around a post or tree, or at a corner or fence, or at any obstacle to which access is difficult, while maintaining the forward position of the device adjacent the obstacle, thus avoiding the need to pull my device away from, and then pushing it forward towards, said obstacle, during the cutting operation.

Another object is to provide a wheel swivelly mounted on which my device may travel in a complete or any part of a circle while maintaining the cutters close to said obstacle as the cutting operation is performed.

A further object is to provide my device with cutting blades so positioned as to define a peripheral arc up to 180 degrees.

A still further object is to provide my device with a compact structure having a frame portion that serves as a mount for a swiveling wheel and a support for both the driving shaft and for the handle by which my device is pushed, thus making it possible to have the traveling wheel adjacent the cutters which gives an operator fine control over the movement of my device when cutting grass in difficult positions.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 3 is a top plan view of the cutter actuating apparatus for my device.

FIG. 4 is an end elevational view of the eccentric crank disc of my device.

FIG. 5 is a side elevational view of the cutter blades and travel cage.

FIG. 6 is a rear elevational view of the mechanism shown in said FIG. 5.

FIG. 7 is a plan view showing the cutter blades in operative position at the end of a cutting stroke.

FIG. 8 is a plan view showing the cutter blades in normal position.

Figure 1:
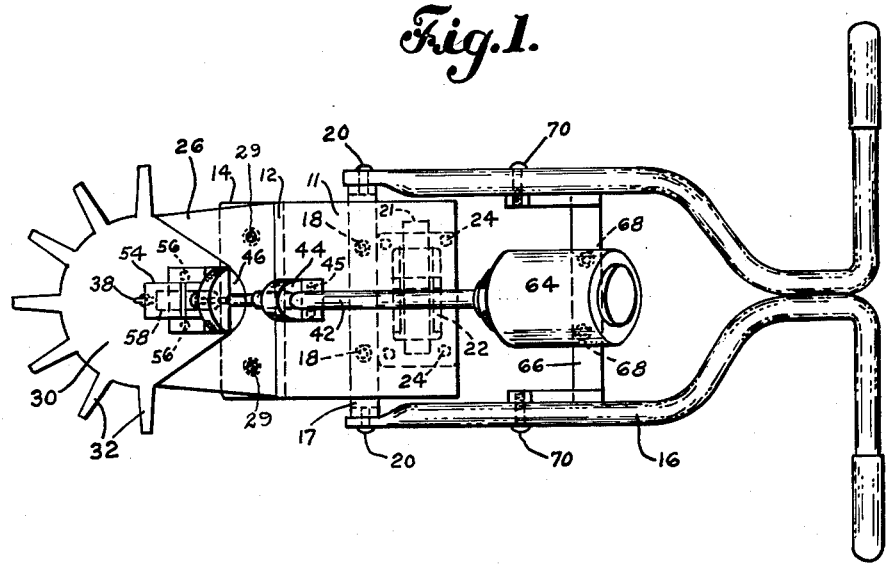
FIG. 1 is a top plan view of a lawn trimming device.
Figure 2:
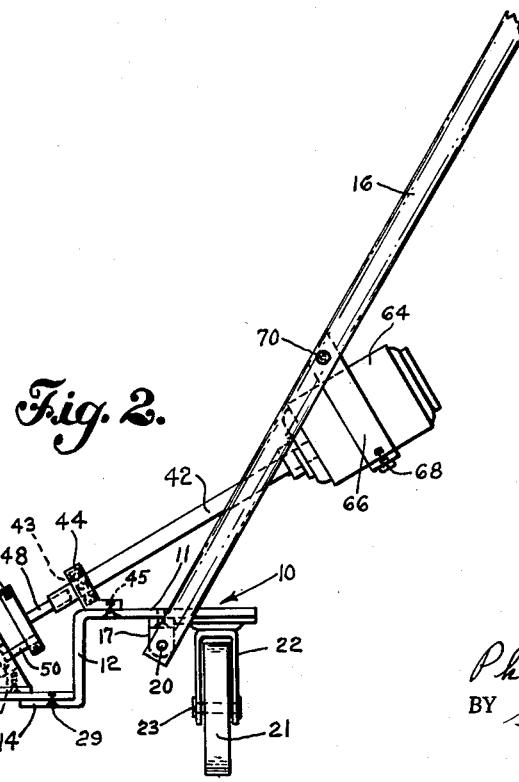
FIG. 2 is a side elevational view thereof.

As illustrated, my lawn trimmer has a supporting frame 10 having a top plate 11, an upright connector part 12 and a cutter support or shelf 14. A handle 16 is shown attached to a bracket 17 by screws 20. Said bracket is fixed to said top plate 11 by screws 18.

A swiveling wheel assembly has a wheel 21 on which my device travels, and which may be turned 360 degrees. It is rotatably supported by a mounting 22, the connection being made by the usual pin 23 extending through said wheel 21 and mounting 22. Screws 24 attach the latter to said top plate 11.

Cutting means includes a stationary or under cutter 26 having blades 28 spaced apart. Screws 29 hold it fixed to said shelf support 14. A movable or upper cutter 30 has blades 32 also spaced apart and which is associated with and movable on said stationary cutter 26 to thereby provide the usual shearing action. A bolt 34 freely extends through said cutters 26 and 30 on which is a coil compressing spring 36 and the usual wing nut 38 is connected thereto.

Actuating apparatus 40 for my device has a hollow shaft 42 driven by a motor 64 later referred to. Said shaft rotates in a ball race 43 that is supported by a bracket 44 that is screwed as at 45 to said top plate 11. Eccentric mechanism includes a crank disc 46 having a shaft 48 that is fixed to said motor-driven shaft 42 and it also includes an eccentric pin 50 eccentrically located on said disc 46 and having a circular head 52 at an end thereof.

A travel cage 54, in the form of a block, extends diagonally upward and forward from said movable cutter 30 to which it is fixedly attached by screws 56. Said cage has a slot 58 therein in which said crank pin head 52 travels in a reciprocatory path as later explained. A cover 60 is screwed as at 62 to said cage 54.

A motor 64 is held by a strap 66 attached to the motor by screws 68, which strap is screwed as at 70 to said handle 16.

In operation, when the handle is pushed my device travels on said swiveling wheel 21. The motor 64, when started, rotates said shaft 42 and thus said actuating apparatus 40. Said crank disc 46 is rotated causing said head 52 to travel in said cage slot 58, bearing upon one side of the latter and then on the other due to the eccentric motion of said pin 50. This moves said cage alternately back and forth to thus effect a reciprocatory movement of said cutter 30, enabling it to shear grass, weeds and the like next to a fence, building, tree or other obstacle.

Said cutters 26 and 30 will maintain a forward cutting position when desired, thus avoiding the need to withdraw and then push my device forward. This is possible because said swiveling wheel 21 can be swung in a complete circle, or any part of a circle, thus keeping said cutters in cutting position as my device is moved about a tree or post or a corner during the cutting operation.

Said cutting blades 28 and 32 are shown extending from one side of said cutters 26 and 30 to another, defining an arc of 180 degrees, since this proves effective in cutting around a tree trunk, post or the like. However, the blades could be varied so that their positions define another arc.

My device may be operated by a motor that is driven by gasoline, or electrically or by batteries. Any means for rotating the shaft 42 enables my device to perform its operation.

What I claim is:

1. A lawn trimming device comprising a support, a wheel swivelly connected to said support, a shaft adapted to be rotated and rotatably supported by said support, one stationary cutter fixedly supported by said support and a movable cutter movably connected to said stationary cutter, eccentric mechanism operably connected to said shaft embodying a crank disc, a pin eccentrically fixed to the latter and a head on said pin, and a travel cage attached to said movable cutter and having a slot therein, said head extending into and being movable in said slot to thereby cause reciprocatory movement of said movable cutter, said support embodying a top plate at the rear, said wheel being under and swivelly connected to said top plate, means attached to said top plate, said shaft being supported by said latter means, a handle, other means attached to said handle supported by said top plate, and shaft supporting means attached to said top plate and to said shaft, said wheel being adjacent a rear edge of said top plate and a portion of said wheel being above said cutters.

2. A lawn trimming device comprising a support having a top plate, an angular connector part extending downwardly therefrom, and a supporting shelf extending laterally from said connector part, a wheel under and swivelly connected to said top plate and extending in its farthest forward position to a point adjacent said connector part, a handle, means attached to said handle supported by said top plate, a shaft adapted to be rotated, means attached to said top plate rotatably supporting said shaft, a stationary cutter directly above and fixed to said shelf and adjacent said connector part, a movable cutter above said stationary cutter and movably connected thereto, eccentric mechanism operably connected to said shaft embodying a crank disc, a pin eccentrically fixed to said disc and having a head at the end thereof, and a travel cage attached to said movable cutter and having a slot therein, said head extending into and being movable in said slot to thereby cause reciprocatory movement of said movable cutter, said wheel being rearwardly of the points of attachment of said shaft and handle.

References Cited by the Examiner

UNITED STATES PATENTS

| | | | |
|---|---|---|---|
| 462,788 | 10/1891 | Wright | 56—240 |
| 871,806 | 11/1907 | Leep | 56—241 |
| 1,032,485 | 7/1912 | Karcher | 56—240 |
| 1,108,611 | 8/1914 | Nystrom | 56—240 |
| 1,660,764 | 2/1928 | Pidlisny | 56—26.5 X |
| 1,841,121 | 1/1932 | Hidde | 56—241 |

FOREIGN PATENTS 1,193,910  4/1959  France.

ABRAHAM G. STONE, *Primary Examiner.*

RUSSELL R. KINSEY, *Examiner.*

MICHAEL C. PAYDEN, *Assistant Examiner.*